(12) United States Patent
Maekawa

(10) Patent No.: US 8,810,171 B2
(45) Date of Patent: Aug. 19, 2014

(54) MOTOR CONTROLLER

(75) Inventor: Sari Maekawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 352 days.

(21) Appl. No.: 13/291,643

(22) Filed: Nov. 8, 2011

(65) Prior Publication Data

US 2012/0112673 A1  May 10, 2012

(30) Foreign Application Priority Data

Nov. 9, 2010  (JP) ................................ 2010-250788

(51) Int. Cl.
| | |
|---|---|
| *H02P 6/06* | (2006.01) |
| *H02P 6/16* | (2006.01) |
| *H02P 6/00* | (2006.01) |

(52) U.S. Cl.
CPC . *H02P 6/002* (2013.01); *H02P 6/16* (2013.01)
USPC ........................ 318/400.06; 318/801; 318/811

(58) Field of Classification Search
USPC ............ 318/400.06, 801, 811, 722, 723, 798, 318/276
See application file for complete search history.

(56) References Cited

U.S. PATENT DOCUMENTS

| 6,445,155 B1 | 9/2002 | Williams et al. | |
|---|---|---|---|
| 2012/0323430 A1* | 12/2012 | Nakamura et al. | ............. 701/22 |

FOREIGN PATENT DOCUMENTS

| JP | 1-270791 A | 10/1989 |
|---|---|---|
| JP | 2001-95279 | 4/2001 |
| JP | 2003-333882 A | 11/2003 |
| JP | 2004-135441 A | 4/2004 |
| JP | 2005-304236 A | 10/2005 |

OTHER PUBLICATIONS

Korean Office Action issued Nov. 8, 2012 in Patent Application No. 10-2011-115037 with English Translation.
Japanese Office Action issued Nov. 6, 2012 in Patent Application No. 2010-250788 with English Translation.
Chinese Office Action issued Nov. 26, 2013 in Patent Application No. 201110351471.3 with English Translation.

* cited by examiner

*Primary Examiner* — Karen Masih
(74) *Attorney, Agent, or Firm* — Oblon, Spivak, McClelland, Maier & Neustadt, L.L.P.

(57) ABSTRACT

A motor controller is disclosed. The motor controller includes a current detector that is provided in a direct current side of a power converter and that detects direct current information. A determiner determines a size of an offset voltage contained in the detected current information. The determiner calculates the offset voltage by canceling a positive current component by a negative current component both pertaining to the same one phase and contained in the detected direct current information. A modifier modifies the detected direct current information based on the calculated offset voltage.

4 Claims, 8 Drawing Sheets

US 8,810,171 B2

MOTOR CONTROLLER

CROSS-REFERENCE TO RELATED APPLICATION(S)

This application is based upon and claims the benefit of priority from Japanese Patent Application No. 2010-250788, filed on, Nov. 9, 2010 the entire contents of which are incorporated herein by reference.

FIELD

Embodiments disclosed herein generally relate to a motor controller that drives a brushless DC motor.

BACKGROUND

Brushless DC motor, hereinafter also referred to as a brushless motor or a motor, is typically driven by AC (Alternating Current) power obtained by converting DC (Direct Current) power through inverter circuit. The voltage of AC power obtained from the inverter circuit is pulsed. In order to keep the brushless motor running, conduction of armature winding needs to be switched from one phase winding to another at a certain rotational position of the rotor, in other words, at a certain timing. This timing of conduction switching is known as commutation timing of winding current. The commutation timing of winding current is correlated with the rotational position of the rotor through control of the ON/OFF drive of switching elements in the inverter circuit. This correlation is typically established through a detecting element that detects the rotational position of the rotor. Examples of such detecting elements include a Hall sensor that detects the actual rotational position of the rotor and a current detector that detects the rotational position of the rotor indirectly through a phase current of the phase winding.

In order to detect multiple phases of phase current by a single current detector, the current detector is disposed on the DC side of the inverter circuit. Examples of current detector include a Hall element type current detector that detects count of magnetic flux generated by DC current and a resistor type current detector that detects a current value as a voltage value. The current detectors, when used in speed control or torque control of the brushless motor, may detect load current the detection signal of which may be used as a feedback signal of the respective controls. In such applications, a current detector may comprise a combination of a detector used in a feedback control and a Hall sensor used in detection of rotor position.

Precise detection of phase current is desired for these current detectors to achieve accurate and stable commutation timing. However, because voltage occurring at the two ends of current detecting resistor in response to the passing current is extremely small, precision of current detection is easily affected by unfavorable properties specific to inner circuitry such as amplifiers and temperatures of peripheral elements and environment. It is specifically desired to reduce the impact of offset voltage/current produced by the properties of detection circuitry such as amplifiers.

DETAILED DESCRIPTION

In one embodiment, a motor controller is disclosed. The motor controller is provided with a power converter that includes a plurality of bridge connected switching elements and that converts incoming direct-current electric power to be supplied to a motor; a switching signal generator that generates at least three phases of switching signals such that the switching elements are driven by an ON/OFF pattern that exhibit a pulse with modulation pattern; and a current detector that is provided on a direct current side of the power converter and that detects direct current information of the direct current side, and that feeds the detected direct current information to the switching signal generator. The switching signal generator includes a determiner that determines a size of an offset voltage contained in the detected direct current information; and a modifier that modifies the detected direct current information based on the size of the offset voltage determined by the determiner. The determiner calculates the offset voltage by canceling a positive current component by a negative current component both pertaining to the same one phase and contained in the detected direct current information and transmits the calculated offset voltage to the modifier.

A first embodiment is described hereinafter with reference to FIGS. 1 to 5.

Figure 1:
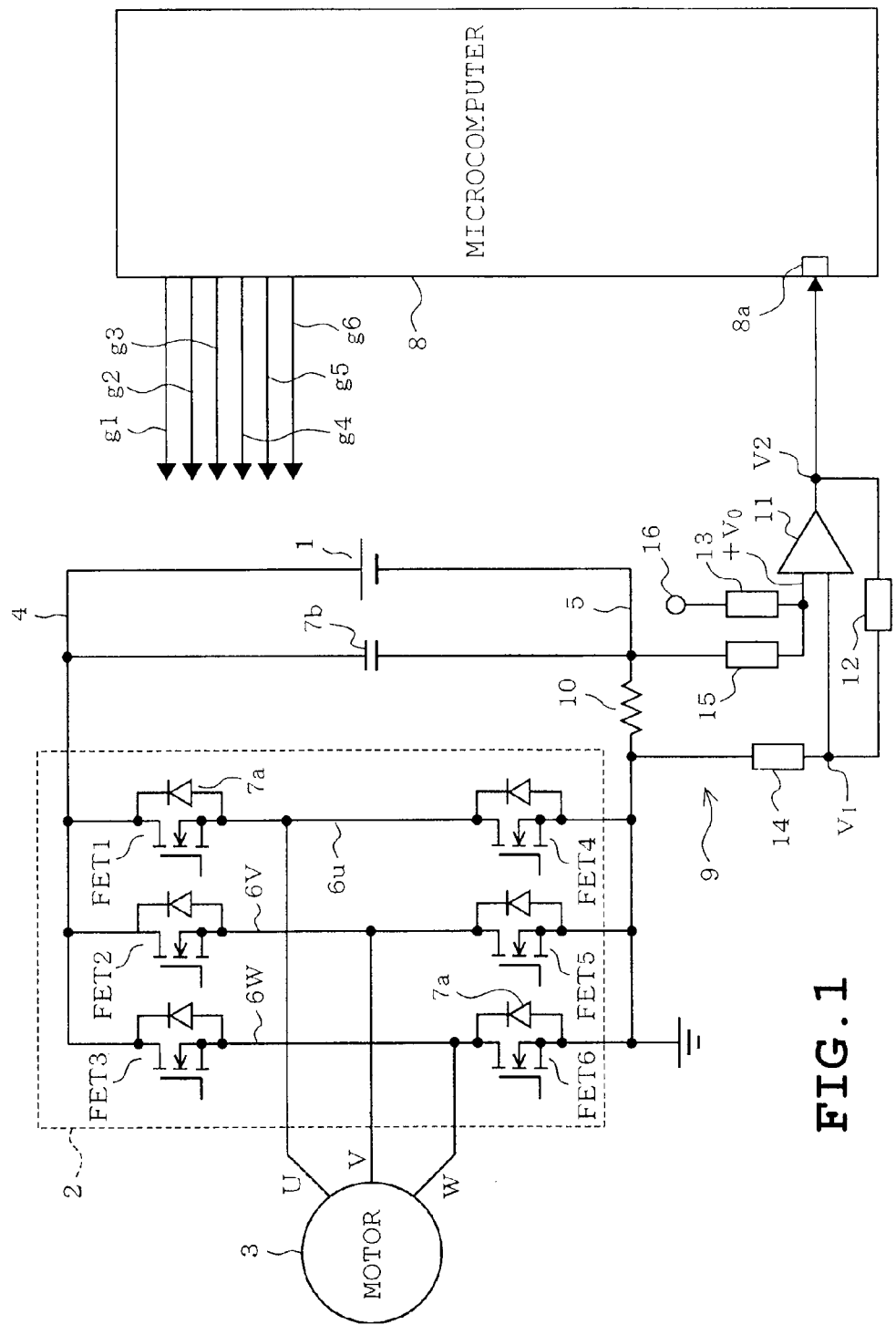
FIG. 1 is a schematic of a circuit according to a first embodiment of the present disclosure.

Referring first to FIG. 1, brushless motor 3 is driven by a drive circuit which receives power through power converter exemplified as inverter circuit 2. Inverter circuit 2 converts the incoming DC power produced by DC power supply 1 to in turn produce the power supplied to the drive circuit. Inverter circuit 2 employs a multi-bridge configuration exemplified as a 3-phase bridge configuration in which a 3-phase bridge arm 6U, 6V, and 6W are connected between DC bus 4 and 5. Each of bridge arms 6U, 6V, and 6W has two of the six switching elements exemplified as FET1 to FET2 series connected to it. FET1 to FET3 serve as positive switching elements whereas FET4 to FET6 serve as negative switching elements. Each of FET1 to FET6 has free wheel diode 7a parallelly connected to it. Still referring to FIG. 1, power capacitor 7b is parallely connected to DC power supply 1.

The controller responsible for controlling the ON/OFF switching of FET1 to FET6 is configured by a microcomputer 8. Microcomputer 8 serves as a switching signal generator that synthesizes the 3 phase PWM (Pulse Width Modulation) signals g1 to g6 and gives the synthesized signals to gates of FET1 to FET6. Thus, the ON/OFF switching of FET1 to FET6 is controlled by PWM pattern and pulse voltage taking an approximately sinusoidal PWM waveform is given to brushless DC motor 3 from inverter circuit 2 to cause a flow of 3-phase AC current in brushless DC motor 3. Current detector 9 comprises current detecting resistor 10 which interposes DC bus in the negative side, an amplifier exemplified as operational amplifier 11 that amplifies voltage occurring at both ends of current detecting resistor 10, and resistors 12 to 15. Among resistors 12 to 15, resistor 12 serves as a gain setting resistor. On the input side of operational amplifier 11, reference voltage +V0 is applied from voltage source 16 by way of resistor 13. Analog output voltage from operational amplifier 11 is given to A/D conversion input port 8a of microcomputer 8.

When the reference voltage applied to the input side of operational amplifier 11 is 0 v, the outgoing analog output voltage from operational amplifier 11 increases/decreases from positive to negative and vice versa from 0 v. However, when a reference voltage of +V0 is given to the input side of operational amplifier 11 as is the case in the first embodiment, the outgoing analog output voltage from operational amplifier 11 increases/decreases from +V0. Operational amplifier 11 employed in the first embodiment is configured to produce an output voltage level ranging between −2.5 v to +2.5 v when reference voltage of 0 v is given to the input side. Further, A/D conversion input port 8a of microcomputer 8 is configured to accept voltage level ranging between 0 v to +5 v. Because of such limitations, reference voltage level V0 is set to +2.5 v in the first embodiment. Accordingly, analog output voltage V2 produced from operational amplifier 11 increases/decreases within the range of 0 v to +5 v.

When brushless motor 3 is running, 3-phase AC current, i.e. phase winding current of brushless motor 3 flows in the output side of inverter circuit 2, and DC current corresponding to the motor current flows through DC bus 4 and 5 in the input side of inverter circuit 2. DC current flows through current detecting resistor 10 and the resulting voltage drop V1 indicates the detected current. Voltage drop V1 is taken into operational amplifier 11 as input voltage and detected voltage V2 which increases/decreases from reference voltage +2.5 v is outputted from operational amplifier 11 as the detected voltage level. The detected voltage level is transmitted to microcomputer 8 through A/D conversion input port 8a to be converted into a digital signal within microcomputer 8.

Microcomputer 8 determines the rotor position of brushless motor 63 from the phase of detected voltage V2, i.e. phase or electric angle of current detected by current detector 9. Then, microcomputer 8 switches the conduction of phase winding in the timing determined based on the rotor position through control of switching elements FET1 to FET6 of inverter circuit 2. Though not shown, microcomputer 8 treats current detected by current detector 9 as feedback information on load current and utilized the feedback information in executing torque control and speed control.

As described earlier, detected voltage V2 outputted from current detector 9 containing operational amplifier 11 unwantedly includes offset voltage. Thus, measures have been taken to remove such offset voltage from the detected voltage. Apart from the approach taken in the first embodiment in removing the offset voltage as will be described hereinafter in detail, exemplary measures of offset voltage removal include adjusting the output of operational amplifier to zero when the input is zero and a numerical adjustment within the microcomputer.

Figure 5:
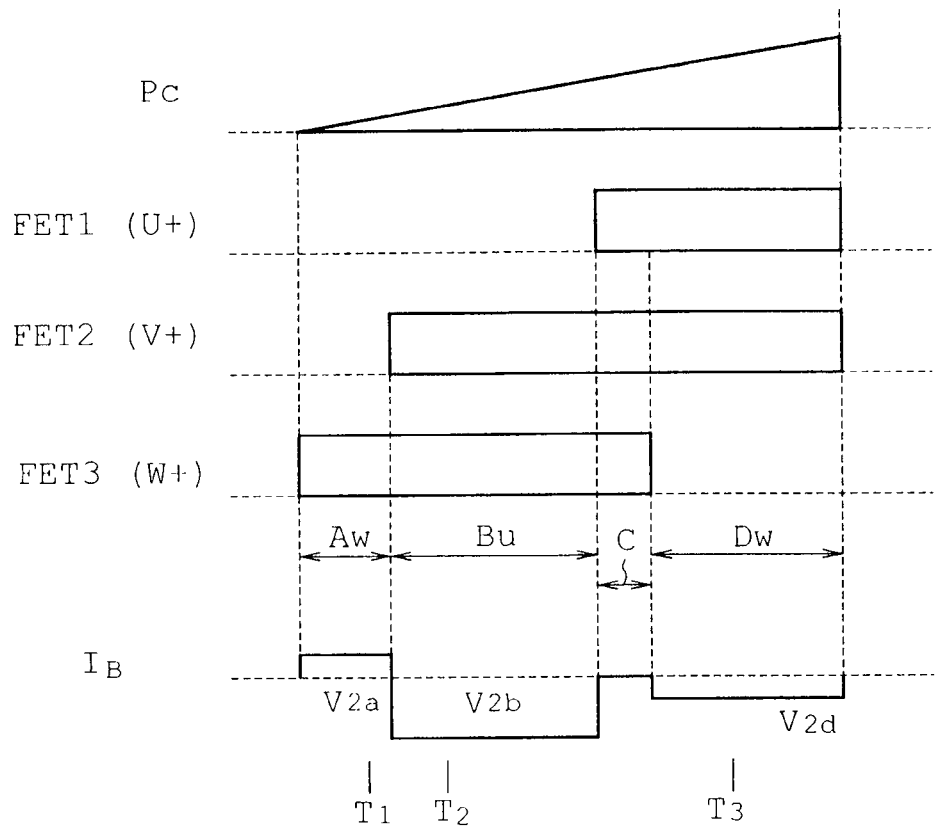
FIG. 5 is a waveform diagram indicating a switching pattern of the inverter circuit according to the first embodiment.
Figure 6:
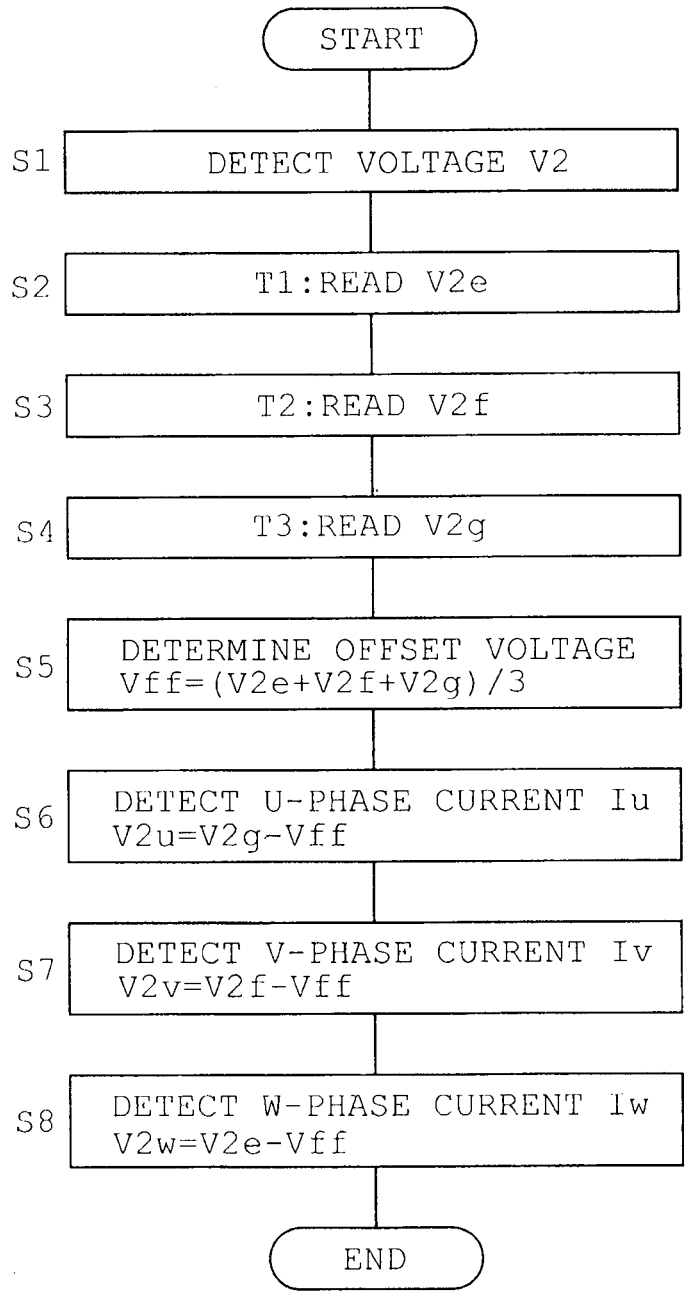
FIG. 6 illustrates a second embodiment of the present disclosure and corresponds to FIG. 2.
Figure 7:
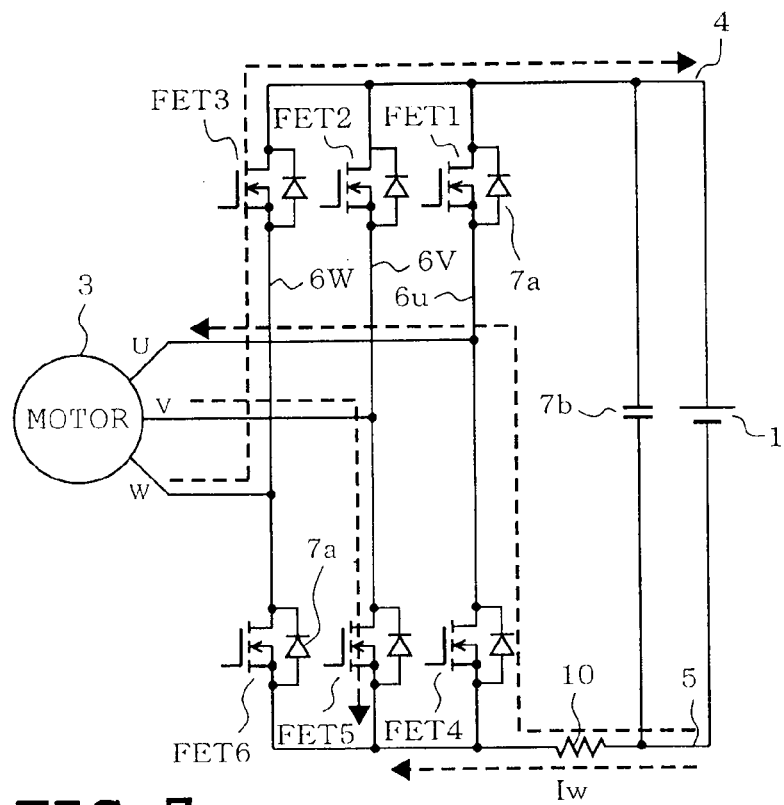
FIG. 7 is a circuit diagram indicating path of a W phase current flow of an inverter circuit according to the second embodiment.
Figure 8:
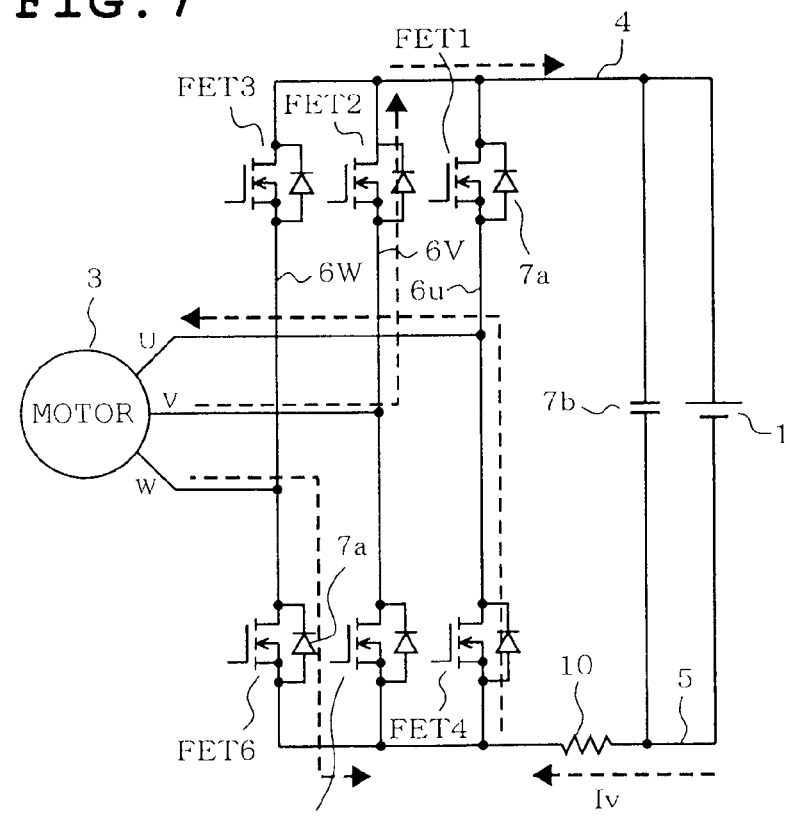
FIG. 8 corresponds to FIG. 7 and indicates path of a V phase current flow of an inverter circuit according to the second embodiment.
Figure 9:
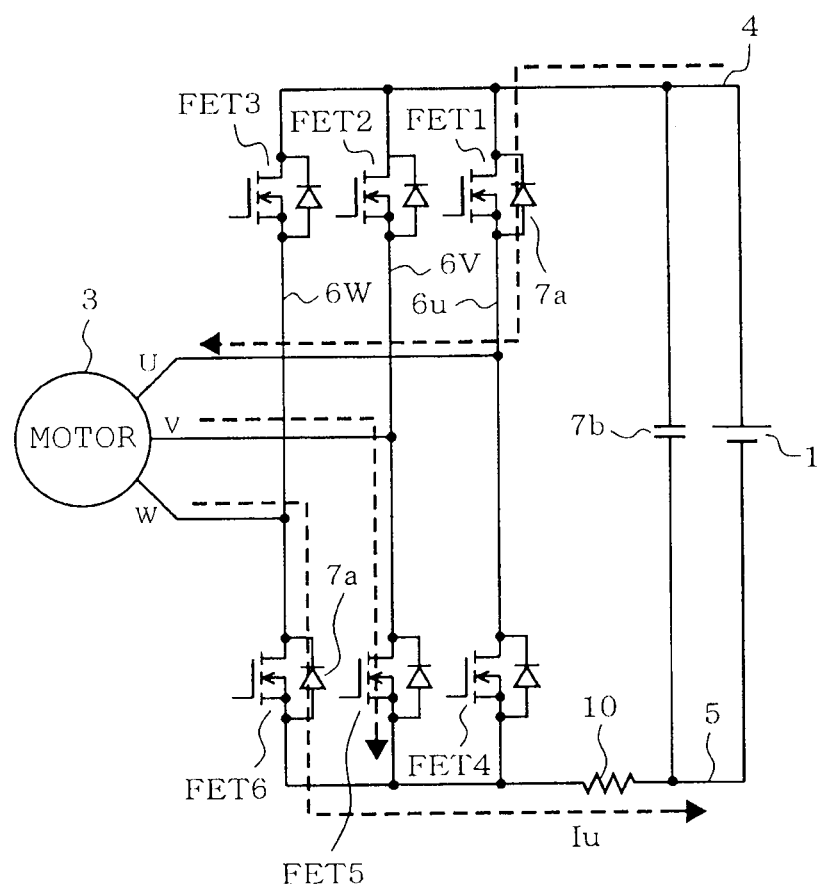
FIG. 9 corresponds to FIG. 7 and indicates path of a U phase current flow of an inverter circuit according to the second embodiment.

Next, a description will be given on a method of offset voltage removal according to the first embodiment. The offset voltage removal is realized through an offset voltage determiner and a modifier provided in microcomputer 8. The modifier removes the offset voltage from detected voltage V2 after it has undergone A/D conversion. FIG. 5 is a chart indicating the interrelation of: a cycle of carrier signal Pc rising from a certain point in time for PWM signal synthesis, switching pattern of switching elements FET1 to FET3 disposed in the positive side of inverter circuit 2, and DC current $I_B$ which generally represents phase currents Iu, Iv, and Iw that flow through current detecting resistor 10. FIG. 5 shows that switching elements FET4 to FET6 in the negative side are turned ON when switching elements FET1 to FET3 are turned OFF. The status of phase current is represented by detected voltage levels V2a, V2b, and V2d and the shown voltage levels V2a, V2b, and V2d reflect the status of the detected voltage level when switching elements FET1 to FET6 take the shown switching pattern. Phase current varies with the switching pattern of switching elements FET1 to FET6 as represented in periods Aw, Bu, C, and Dw. One of the features of the switching pattern is that DC current $I_B$ flowing through the DC side of inverter circuit 2 is single phased during certain periods as exemplified in periods Aw and Dw. This can also be recognized through the ON/OFF states of the 3 switching elements FET1 to FET3 in the positive side in that one of the switching elements FET1 to FET3 is turned ON and the remaining two are turned OFF. As described earlier, switching elements FET4 to FET6 in the negative side indicate opposite ON/OFF states to those of switching elements FET1 to FET3.

Figure 3:
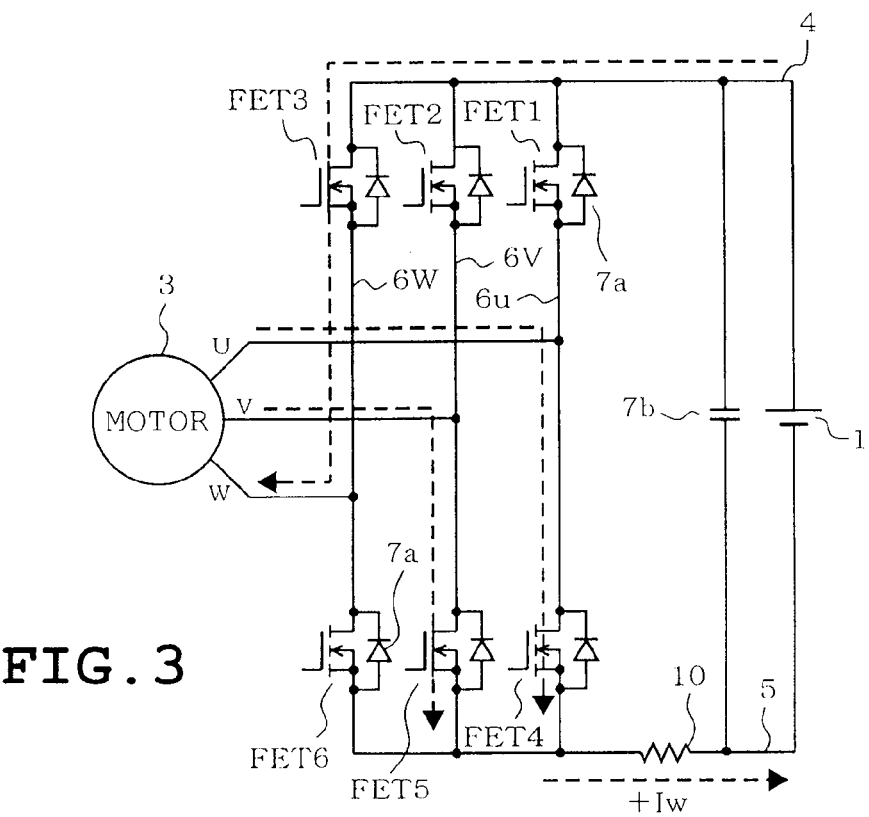
FIG. 3 is a circuit diagram indicating one example of paths of current flowing through an inverter circuit according to the first embodiment.
Figure 4:
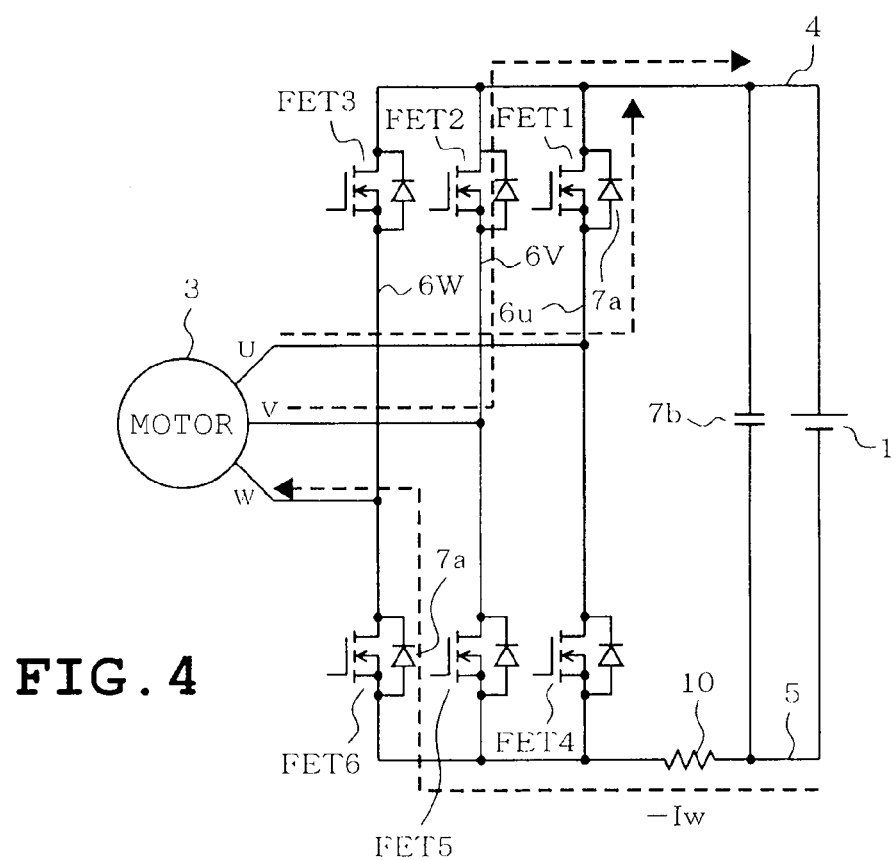
FIG. 4 is a circuit diagram indicating another example of paths of current flowing through the inverter circuit.

FIG. 3 shows the path of current through inverter circuit 2 during period Aw in which only phase current Iw is flowing, whereas FIG. 4 shows the path of current through inverter circuit 2 during period Dw in which only phase current Iw is flowing. Comparison of FIGS. 3 and 4 shows that the size of phase current Iw in the DC side of inverter circuit 2 is the same in FIGS. 3 and 4 and that phase current Iw flow in the opposite directions in FIGS. 3 and 4. It can be gathered from FIGS. 3, 4, and 5 that during period Aw, only switching element FET3 disposed in the positive side is turned ON, whereas during period Dw, only switching element FET6 disposed in the negative side is turned ON. This is an indication that switching pattern during periods Aw and Dw only allow flow of a single phase through current detecting resistor 10, which, in this case, is W phase current Iw. As can be seen from comparison of detected voltage V2a and V2d, current Iw varies its direction of flow in some periods depending on switching pattern.

In the first embodiment, the offset voltage is detected or determined based on the phase current observed in a period of a switching pattern where only a single phase of DC current $I_B$ flows through inverter circuit 2. This means that detected voltage V2 outputted from operational amplifier 11 is a sum of the voltage level corresponding to the level of current passed through current detecting resistor 10, reference voltage V0, and offset voltage Vf occurring within current detector 9.

Figure 2:
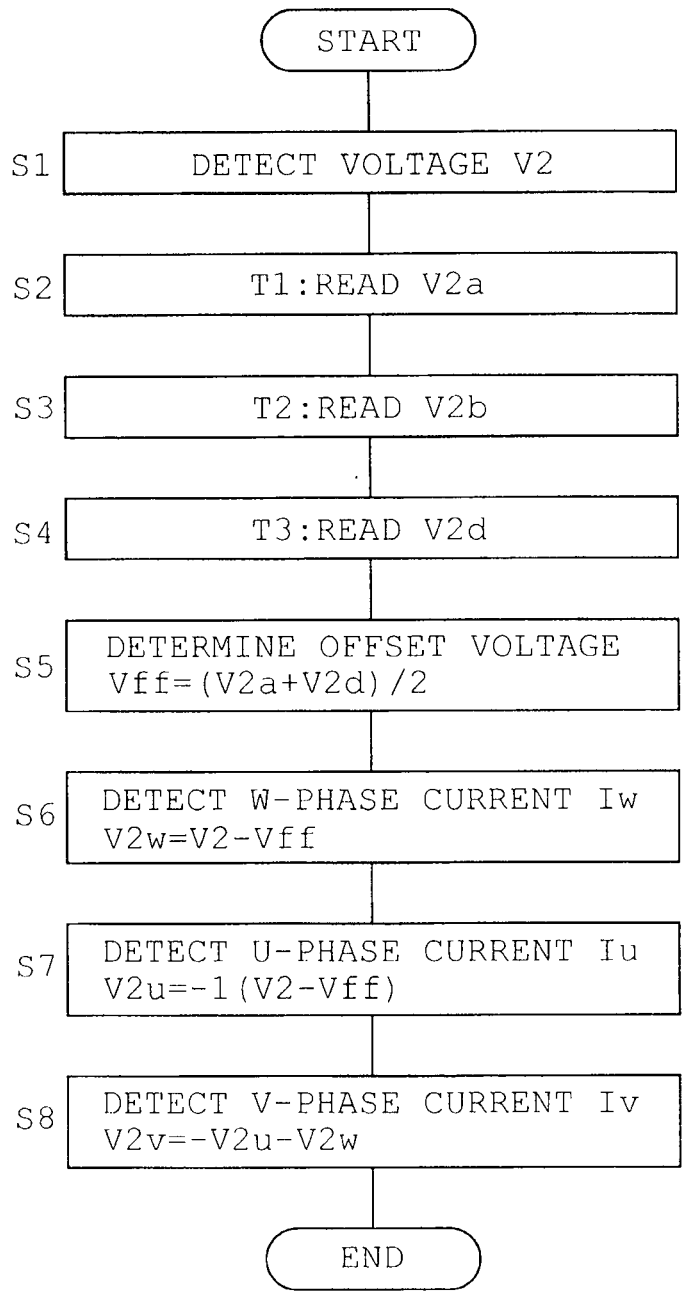
FIG. 2 is a flowchart of a process flow for calculating an offset voltage according to the first embodiment.

Next, a description will be given on the determination of offset voltage Vf and modification of detected current, that is, detected voltage V2 based on the flowchart of FIG. 2.

At step S1, voltage V2 is detected which is thereafter written into the register of microcomputer 8 after A/D conversion. The writing is carried out only during periods Aw, Bu, and Dw of the switching pattern when only a single phase current passes through current detecting resistor 10 as shown in FIG. 5. Period C in which all of switching elements FET1 to FET6 are turned ON is eliminated from the detection target since the sum of the three phase currents amounts to zero. Voltages V2 detected and written into the register during periods Aw, Bu, and Dw, respectively are represented as V2a, V2b, and V2d in FIG. 5. Reference symbols T1 to T3 indicate the write timings of V2a, V2b, and V2d.

Steps 2, 3, and 4 read voltages V2a, V2b, and V2d which were written into the register at timings T1, T2, and T3, respectively. Step S5 indicates the operation of an offset voltage determiner. The offset voltage determiner reads voltage levels V2a and V2d from the register which represent the voltage levels detected during period Aw and Dw when only current Iw of the W phase occurs. The offset voltage determiner calculates offset voltage determinant Vff according to a predetermined formula "Vff=(V2a+V2d)/2". At this instance, both V2a and V2d are equivalents of a sum of voltage drop V1 at current detecting resistor 10, reference voltage V0, and offset voltage Vf. Because voltage drops V1 in V2a and V2d have opposite polarities, and thus, cancels each other out, the above formula can be transformed to "Vff=V0+Vf" which gives the offset voltage. Sum of V2a and V2d is divided by 2 in the original formula because "V0" and "Vf" are doubled as the result of V2a+V2d. Thus, based on the polarity (positive/negative) of detected voltages V2a and V2d, phase current component is cancelled or removed from detected voltage V2.

Steps S6 to S8 indicate the operation of modifier that removes the offset voltage from the detected value to obtain a phase current value exclusive of the offset voltage. Step S6 calculates "V2w=V2−Vff". The resulting V2w equals V2 minus reference voltage V0 and offset voltage Vf and thus, results in the W phase current Iw that does not include offset voltage Vf. Step S7 calculates "V2u=−1×(V2−Vff)". Multiplying "−1" can be explained by negative direction of current flow of U-phase current Iu through current detecting resistor 10 during Bu period. The resulting V2u equals V2 minus reference voltage V0 and offset voltage Vf and thus, results in the U phase current Iu that does not include offset voltage Vf. Step S8 calculates "V2v=−V2u−V2w" based on fact that the sum of U, V, and W phase currents Iu, Iv, and Iw are zero to obtain detected value V2v of V-phase current IV that does not contain offset voltage Vf.

Figure 10:
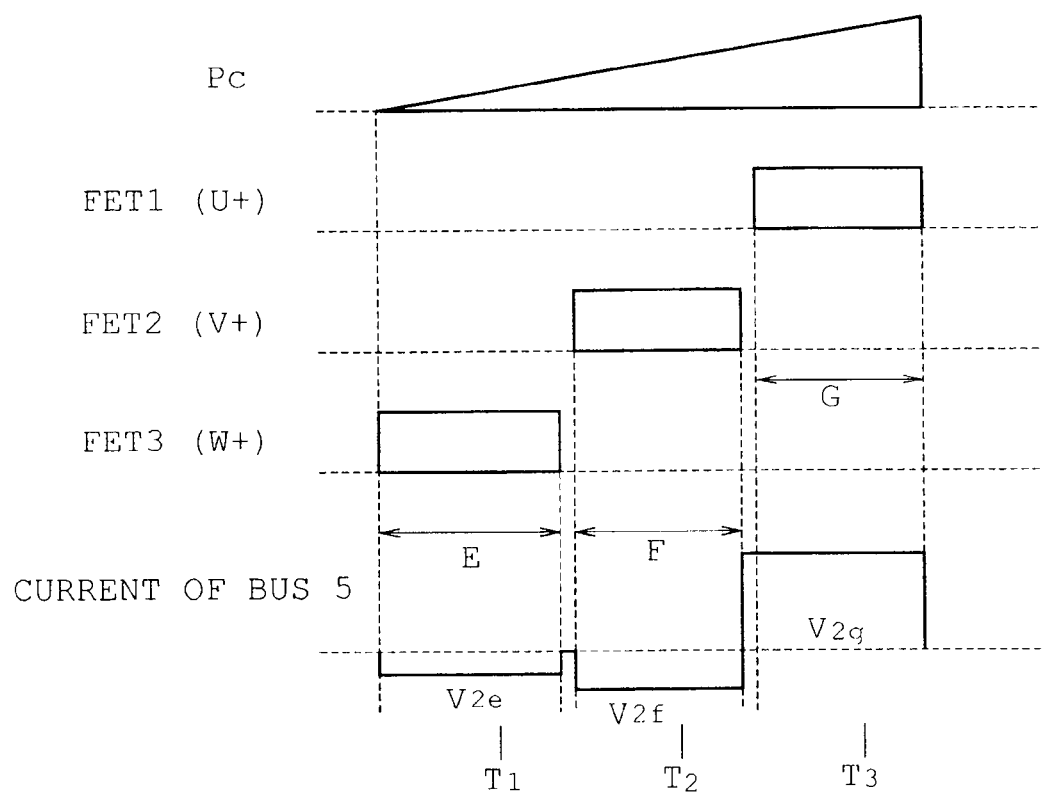
FIG. 10 corresponds to FIG. 5 and is a waveform diagram indicating a switching pattern of the inverter circuit according to the second embodiment.

Next, a description will be given on a second embodiment of the present disclosure with reference to FIGS. 6, 7, 8, 9, and 10. The switching pattern indicated in the chart of FIG. 10 shows that only one of the three positive side switching elements FET1, FET2, and FET3 are turned ON at a time. For instance, during period E when only the W phase FET3 is turned ON, only W-phase current Iw flows through current detecting resistor 10 so as to follow the path indicated by the arrow in FIG. 7. During period F when only the V phase FET2 is turned ON, only V-phase current Iv flows through current detecting resistor 10 so as to follow the path indicated by the arrow in FIG. 8. During period G when only the U phase FET1 is turned ON, only U-phase current Iu flows through current detecting resistor 10 so as to follow the path indicated by the arrow in FIG. 9. At step S1, of the flowchart indicated in FIG. 6, voltage V2 is detected which is thereafter written into the register of microcomputer 8 after A/D conversion. That is, voltage V2e detected by current detector 9 during period E, voltage V2f detected by current detector 9 during period F, and voltage V2g detected by current detector 9 during period G are written to the register.

Steps 2, 3, and 4 read detected voltages V2e, V2f, and V2g that were written into the register.

At step S5 which indicates the operation of offset voltage determiner, "Vff=(V2e+V2f+V2g)/3)" is calculated. Because the sum of the three phase current amounts to zero, the equation is transformed to "Vff=V0+Vf" based upon which the offset voltage is obtained. Sum of V2e, V2f, and V2g is divided by 3 in the original formula because "V0" and "Vf" are tripled. Steps S6 to S8 indicate the operation of modifier that removes the offset voltage from the detected value to obtain phase current value exclusive of the offset voltage. Step S6 calculates "V2u=V2g−Vff" for detection of U-phase current Iu. Similarly, Step S7 calculates "V2v=V2f−Vff" for detection of V-phase current Iv, and step S8 calculates "V2w=V2e−Vff" for detection W-phase current Iw. The sequence of the above described steps obtains the detected values V2u, V2v, and V2w of U-, V-, and W-phase current that does not include offset voltage.

Next, a description will be given on a third embodiment. The first embodiment utilizes the principle that the sum of opposing currents, i.e. the positively oriented current and the negatively oriented current of the same phase amounts to zero to eliminate the phase current component from the offset voltage determinant Vff which leaves offset voltage Vf and reference voltage V0 remaining as the offset voltage determinant Vff. Alternatively, the third embodiment takes the approach of further eliminating reference voltage V0 from the offset voltage determinant Vff. During the process of writing detected voltage V2 to the register after it has been A/D converted within microcomputer 8, the difference of V2 and V0 may be obtained and the difference as well as its polarity, i.e. +/− may be written into the register.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A motor controller, comprising:
a power converter that includes a plurality of bridge connected switching elements and that converts incoming direct-current electric power to be supplied to a motor;
a switching signal generator that generates at least three phases of switching signals such that the switching elements are driven by an ON/OFF pattern that exhibits a pulse width modulation pattern; and
a current detector that is provided on a direct current side of the power converter and that detects direct current information of the direct current side, and that feeds the detected direct current information to the switching signal generator,
wherein the switching signal generator includes a determiner that determines a size of an offset voltage contained in the detected direct current information, and a modifier that modifies the detected direct current information based on the size of the offset voltage determined by the determiner, and
wherein the determiner calculates the offset voltage by canceling a positive current component by a negative current component contained in the detected direct current information, the direct current information being detected in a first period in which a positive-side switching element of a first phase is ON and positive-side switching elements of a second phase and a third phase are OFF and a second period in which a negative-side switching element of the first phase is ON and negative-side switching elements of the second phase and the third phase are OFF, the first period and the second period being a period in which a motor current flows in the same direction and transmits the calculated offset voltage to the modifier.

2. A motor controller, comprising:
a power converter that includes a plurality of bridge connected switching elements and that converts incoming direct-current electric power to be supplied to a motor;
a switching signal generator that generates three phases of switching signals such that the switching elements are driven by an ON/OFF pattern that exhibits a pulse width modulation pattern; and
a current detector that is provided on a direct current side of the power converter and that detects direct current information of the direct current side, and that feeds the detected direct current information to the switching signal generator,
wherein the switching signal generator includes a determiner that determines a size of an offset voltage contained in the detected direct current information, and a modifier that modifies the detected direct current information based on the size of the offset voltage determined by the determiner, and
wherein the determiner calculates the offset voltage by obtaining a sum of current components each contained in the detected direct current information for each of the three phases, each of the detected direct current information of the three phases being detected in a period in which a positive-side switching element of one phase and negative-side switching elements of other two phases are ON at the same time and transmits the calculated offset voltage to the modifier.

3. The motor controller according to claim 1,
wherein the switching signal generator comprises a microcomputer and the current detector comprises a current detecting resistor and an operational amplifier that takes in a voltage drop of the current detecting resistor as an input voltage and that amplifies the input voltage to produce an output of a detected voltage,
wherein the determiner calculates the offset voltage by obtaining an offset voltage determinant which is given by the sum of the detected voltage of the positive current component and the detected voltage of the negative current component in order to cancel the detected voltages and dividing the sum by two, and
wherein the modifier subtracts the offset voltage determinant from the detected voltages.

4. The motor controller according to claim 3, wherein the offset voltage determinant includes a reference voltage which is applied to the operational amplifier such that a negative input given to the operational amplifier is modified to produce a positive output from the operational amplifier.

* * * * *